United States Patent
Trainin

(10) Patent No.: US 8,737,368 B2
(45) Date of Patent: May 27, 2014

(54) METHOD, APPARATUS AND SYSTEM FOR SWITCHING TRAFFIC STREAMS AMONG MULTIPLE FREQUENCY BANDS

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 12/977,244

(22) Filed: Dec. 23, 2010

(65) Prior Publication Data

US 2011/0261754 A1 Oct. 27, 2011

Related U.S. Application Data

(60) Provisional application No. 61/327,757, filed on Apr. 26, 2010.

(51) Int. Cl.
*H04W 72/00* (2009.01)

(52) U.S. Cl.
USPC ............ 370/338; 370/343; 370/462; 370/480

(58) Field of Classification Search
None
See application file for complete search history.

(56) References Cited

U.S. PATENT DOCUMENTS

| | | | |
|---|---|---|---|
| 7,801,043 B2 | 9/2010 | Ali et al. | |
| 2003/0236064 A1 | 12/2003 | Shiohara et al. | |
| 2005/0164744 A1* | 7/2005 | du Toit ........................ | 455/562.1 |
| 2005/0195858 A1 | 9/2005 | Nishibayashi et al. | |
| 2005/0281227 A1 | 12/2005 | Vedder et al. | |
| 2006/0034219 A1 | 2/2006 | Gu et al. | |
| 2006/0251119 A1 | 11/2006 | Ramesh | |
| 2007/0104138 A1 | 5/2007 | Rudolf et al. | |
| 2007/0135162 A1 | 6/2007 | Banerjea et al. | |
| 2008/0239957 A1 | 10/2008 | Tokura et al. | |
| 2008/0320354 A1 | 12/2008 | Doppler et al. | |
| 2009/0088089 A1 | 4/2009 | Chandra et al. | |
| 2010/0046455 A1 | 2/2010 | Wentink et al. | |
| 2010/0074190 A1 | 3/2010 | Cordeiro et al. | |
| 2010/0103885 A1 | 4/2010 | Cordeiro et al. | |
| 2010/0332822 A1 | 12/2010 | Liu et al. | |
| 2011/0065440 A1 | 3/2011 | Kakani | |
| 2012/0182954 A1 | 7/2012 | Cordeiro et al. | |

FOREIGN PATENT DOCUMENTS

| | | |
|---|---|---|
| CN | 1671136 A | 9/2005 |
| CN | 1713775 | 12/2005 |
| CN | 1813448 | 8/2006 |
| CN | 101116306 A | 1/2008 |
| CN | 101631029 A | 1/2010 |

(Continued)

OTHER PUBLICATIONS

Office Action Received for Japanese Patent Application No. 2011-090681, Mailed on Sep. 25, 2012, 6 pages of Office Action including 3 pages of English Translation.

(Continued)

*Primary Examiner* — Alex Skripnikov
(74) *Attorney, Agent, or Firm* — Shichrur & Co.

(57) ABSTRACT

Devices, systems and methods may provide control of traffic streams before transition to another frequency band, during a transition and after a transition is completed and the devices are active in the other frequency band or in multiple frequency bands. The provided solution cover the transparent mode when the devices have the same Medium Access Control (MAC) addresses in both frequency bands and the non-transparent mode when at least one of the communicating devices has different MAC addresses in the different frequency bands.

25 Claims, 5 Drawing Sheets

(56) References Cited

FOREIGN PATENT DOCUMENTS

| | | |
|---|---|---|
| EP | 1610509 | 12/2005 |
| JP | 2002335201 A | 11/2002 |
| JP | 2003-244159 | 8/2003 |
| JP | 2003-244159 A | 8/2003 |
| JP | 2006-54884 A | 2/2006 |
| JP | 2007-006327 A | 1/2007 |
| JP | 2007-532047 A | 11/2007 |
| JP | 2008167285 A | 7/2008 |
| JP | 2008538272 A | 10/2008 |
| JP | 2009-518963 A | 5/2009 |
| JP | 2009-206848 A | 9/2009 |
| JP | 2012-503944 A | 2/2012 |
| KR | 10-2007-0043346 A | 4/2007 |
| KR | 10-2007-0120022 A | 12/2007 |
| KR | 10-0819705 B1 | 3/2008 |
| WO | 2005006662 | 1/2005 |
| WO | 2005/069878 A2 | 8/2005 |
| WO | 2006/085194 A1 | 8/2006 |
| WO | 2006080749 A1 | 8/2006 |
| WO | 2006/107886 A2 | 10/2006 |
| WO | 2010/022256 A2 | 2/2010 |
| WO | 2010/036595 A2 | 4/2010 |
| WO | 2011/005567 A2 | 1/2011 |

OTHER PUBLICATIONS

Office Action Received for Japanese Patent Application No. 2011-088260, Mailed on Sep. 25, 2012, 8 pages of Office Action including 4 pages of English Translation.

Office Action received for Japanese Patent Application No. 2011-084836, Mailed on Oct. 2, 2012, 4 pages of Office Action including 2 pages of English Translation.

International Preliminary Report on Patentability for PCT/US2011/033878 Mailed on Nov. 8, 2012; 6 pages.

International Preliminary Report on Patentability for PCT/US2011/031090 Mailed on Nov. 8, 2012; 5 pages.

International Preliminary Report on Patentability for PCT/US2011/033886 Mailed on Nov. 8, 2012; 6 pages.

IEEE Std 802.11, IEEE Standard for Information technology—Telecommunications and information exchange between systems—Local and metropolitan area networks—Specific requirements, Part 11: Wireless LAN Medium Access Control (MAC) and Physical Layer (PHY) Specifications—Jun. 2007, pp. 1-1184.

International Search Report and Written Opinion Received for PCT Application No. PCT/US2010/043846, mailed on Apr. 29, 2011, 8 pages.

Office Action from U.S. Appl. No. 12/551,614 mailed on Apr. 11, 2012; 20 pages.

International Preliminary Report on Patentability for PCT/US2010/043846 mailed on Mar. 15, 2012.

Office Action from U.S. Appl. No. 12/551,614 mailed on Oct. 18, 2012; 19 pages.

International Search Report and Written Opinion received for PCT Patent Application No. PCT/US2011/031090, mailed on Nov. 22, 2011, 8 pages.

International Search Report and Written Opinion received for PCT Patent Application No. PCT/US2011/033878, mailed on Dec. 15, 2011, 9 pages.

International Search Report and Written Opinion received for PCT Patent Application No. PCT/US2011/033886, mailed on Dec. 15, 2011, 9 pages.

Office Action Received for Chinese Patent Application No. 201010287221.3, Mailed on Mar. 5, 2013, 11 pages Office Action including 3 pages English Translation.

Office Action received for Japanese Patent Application No. 2011-088260, mailed on Feb. 26, 2013, 2 pages of Office Action including 1 page of English Translation.

Office Action for U.S. Appl. No. 13/432,066, mailed on Apr. 15, 2013, 9 pages of Office Action.

Eldad Perahia et al., "IEEE 802.11ad: Defining the Next Generation Multi-Gbps Wi-Fi", IEEE 2010, 5 pages.

U.S. Appl. No. 12/551,614, filed Sep. 1, 2009, Cordeiro.

U.S. Appl. No. 12/977,289, filed Dec. 23, 2010, Cordeiro et al.

U.S. Appl. No. 12/977,268, filed Dec. 23, 2010, Cordeiro.

Office Action for Chinese Patent Application No. 201110116529.6; mailed on Jul. 25, 2013, 23 pages, including 15 pages of English translation.

Office Action for U.S. Appl. No. 12/977,268, mailed on Jun. 27, 2013, 31 pages.

Office Action received for Chinese Patent Application No. 201110116563.3, Mailed on May 23, 2013, 17 pages of Office Action Including 10 page of English Translation.

Office Action received for Chinese Patent Application No. 201110116551.0, mailed on Jun. 18, 2013, 16 pages including 9 pages of English translation.

Office Action Received for Japanese Patent Application No. 2012-527879, Mailed on May 14, 2013, 6 pages of Office Action Including 3 page of English Translation.

Cordeiro, "PHY/MAC Complete Proposal to TGad", IEEE 802.11-10/0432r2, May 18, 2010, 57 pages.

Naveen et al., "Fast Session Transfer NT", IEEE 802.11-10/0436r2, May 18, 2010, 15 pages.

Office Action for Korean Patent Application No. 10-2012-7025744, mailed on Nov. 28, 2013, 8 pages, including 4 pages of English translation.

Office Action received for Korean Patent Application No. 2012-7025549, Mailed on Feb. 26, 2014, 2 pages of English Translation.

* cited by examiner

| Order | Information |
|---|---|
| 1 | Category |
| 2 | Action |
| 3 | Dialog Token |
| 4 | Block Ack Param |
| 5 | Block Ack Timeout |
| 6 | Block Ack SSN |
| 7 | Band ID |
| 8 | TCLAS |

300

| Order | Information |
|---|---|
| 1 | Category |
| 2 | Action |
| 3 | Dialog Token |
| 4 | Status code |
| 5 | Block Ack Param |
| 6 | Block Ack Timeout |
| 7 | Band ID |
| 8 | TCLAS |

310 a) ADDBA REQUEST   b) ADDBA RESPONSE

METHOD, APPARATUS AND SYSTEM FOR SWITCHING TRAFFIC STREAMS AMONG MULTIPLE FREQUENCY BANDS

CROSS REFERENCE TO RELATED APPLICATIONS

This application claims the priority from Provisional Patent Application 61/327,757, filed on Apr. 26, 2010 (and entitled "Method System and Apparatus For Communication At Wireless Link"), which is incorporated in its entirety herein by reference.

BACKGROUND OF THE INVENTION

Wireless local area network (WLAN) and personal area network (PAN) devices that use different radios are widely used in many platforms like notebooks, net-books, desktop computers, cellular telephones, mobile personal devices and the like. The WLAN and PAN devices may include for example, Bluetooth (BT) and WiFi transceivers. The BT and WiFi transceivers may operate on the same frequency band for example, 2.4 GHz band or on different frequency bands. For example, the BT transceiver may operate at the 2.4 GHz band and the WiFi transceiver may operate at the 5 GHz band.

Another frequency band that the WLAN and PAN devices may use is the 60 GHz frequency band. WiFi compliant devices may use 2.5 GHz, 5 GHz and 60 GHz frequency bands. One of the problems with switching transceivers between multiple FREQUENCY bands is the switching of traffic streams from one frequency band e.g., 60 GHz to the other frequency band e.g., 5 GHz, 2.4 GHz or operating in parallel in many FREQUENCY bands efficiently.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
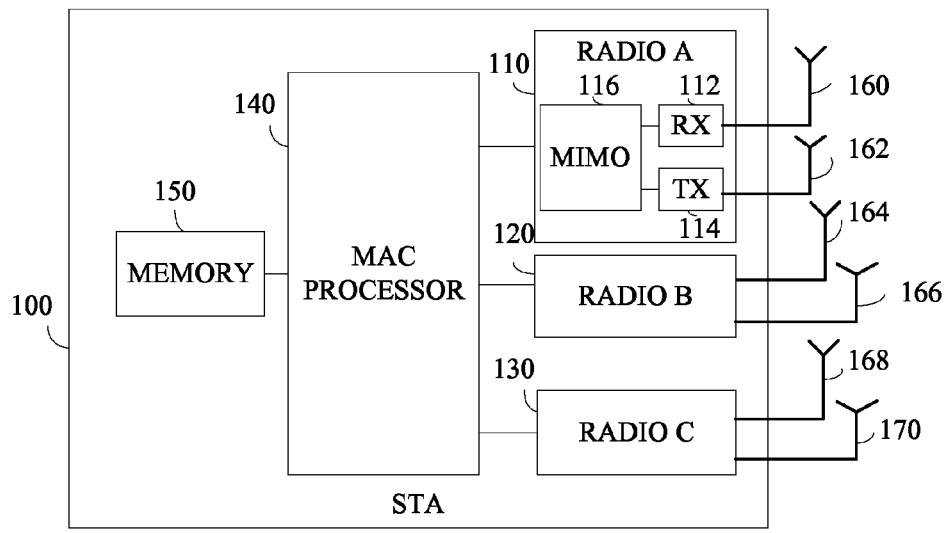
FIG. 1 is a schematic illustration of a station of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more then one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The terms "traffic" and/or "traffic stream(s)" as used herein, are defined as a data flow and/or stream between wireless devices such as stations (STAs). The term "session" as used herein is defined as a state information kept in a pair of stations that have an established a direct physical (PHY) link (e.g., excludes forwarding). The term "fast session transfer" (FST) as used herein is define as the transfer of a session from a channel to another channel when the communicating STAs both have matching radios in the frequency band(s) they wish to communicate.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Embodiments of the invention provide control of the traffic streams before transition from a first frequency band to the other frequency band, during the transition and after the transition is completed and the devices are active in the other frequency band or in multiple frequency bands. The provided solution by some embodiments of the present invention may cover a transparent mode when the devices may have for example, the same MAC addresses in both frequency bands and other embodiments of the invention may provide a non-transparent mode when at least one of the communicating devices may have different MAC addresses in the different frequency bands, although the scope of the present invention is not limited to these examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Are Network (WVAN), a Local Area Network (LAN), a Wireless LAN (WLAN), a Personal Area Network (PAN), a Wireless PAN (WPAN), devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-1999: Wireless LAN Medium Access Control (MAC) and Physical Layer (PHY) Specifications) standards ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Turning first to FIG. 1 a schematic illustration of a station of a wireless communication network according to exemplary embodiments of the present invention is shown. According to embodiments of the present invention a station 100 may be a wireless communication device for example, an access point, a piconet controller (PNC), a station, an initiator, a responder or the like. Station 100 may be, for example, a multiband station.

According to exemplary embodiments of the invention station 100 may be a multiband station, if desired. Station 100 may include for example, a plurality of radios for example radio A 110, radio B 120 and radio C 130. Each of radio A 110, radio B 120 and radio C 130 is operably coupled to two or more antennas. For example radio A 110 is operably coupled to antennas 160 and 162, radio B 120 is operably coupled to antennas 164 and 166 and radio C is operably coupled to antennas 168 and 170.

Radio A 110, radio B 120 and radio C 130 may have a similar architecture which is shown for radio A 110. For example each radio may include at least a multiple-input-multiple-output (MIMO) controller 116 and/or beam forming controller, a receiver (RX) 112 and a transmitter (TX) 114, although the scope of the present invention is not limited in this respect.

Furthermore, according to some embodiments of the invention, each of the radios may operate on a different frequency band, if desired. For example, radio A 110 may operate on a 60 GHz frequency band, radio B 120 may operate on a 5 GHz frequency band and radio C 130 may operate on 2.4

GHz frequency band, although it should be understood that embodiments of the present invention are not limited to this example.

Station 100 may further include a MAC block 140 and a memory 150. MAC block 140 may operate a MAC protocol according to IEEE 802.11TAGad and/or IEEE 802.15.3c and or WirelessHD™ and/or ECMA-387 and/or ISO/IEC 13156: 2009 and/or Bluetooth™ and/or WGA specification, if desired.

Memory 150 may include one or more of volatile memory, non-volatile memory, removable or non-removable memory, erasable or non-erasable memory, writeable or rewriteable memory, and the like. For example, memory 150 may include one or more random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

In some exemplary embodiments, antennas 160, 162, 164, 166, 168 and 170 may include, for example, phase array antennas, an internal and/or external RF antenna, a dipole antenna, a monopole antenna, an omni-directional antenna, an end fed antenna, a circularly polarized antenna, a microstrip antenna, a diversity antenna, or other type of antenna suitable for transmitting and/or receiving wireless communication signals, blocks, frames, transmission streams, packets, messages and/or data, although the scope of the present invention is not limited to these examples.

Figure 2:
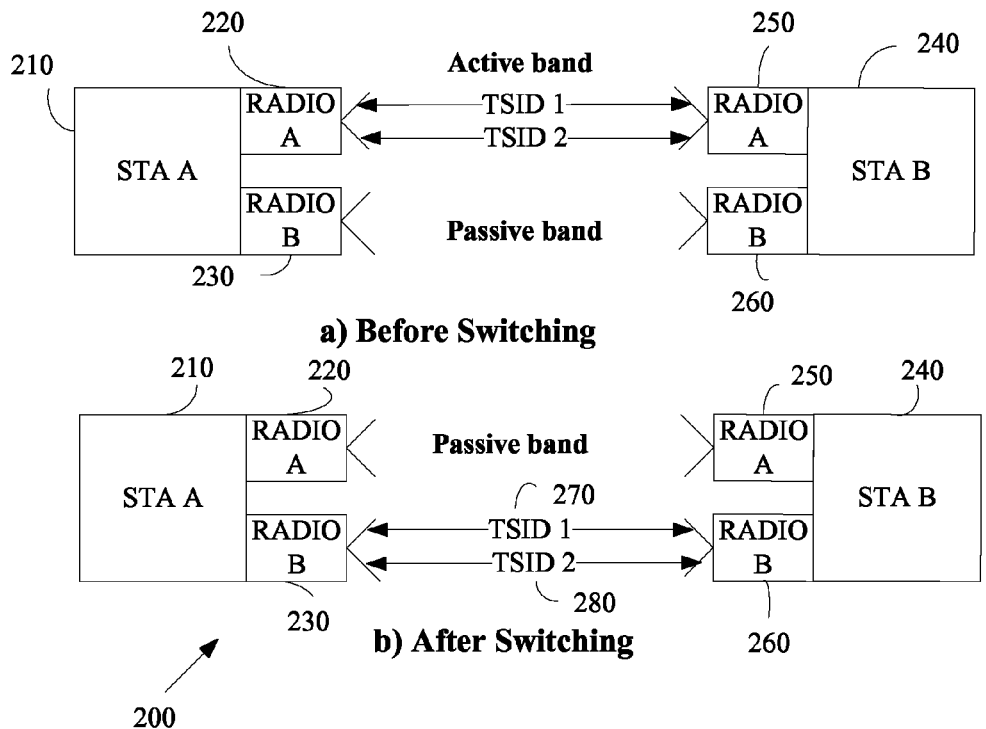
FIG. 2 is a schematic illustration of a wireless communication network according to exemplary embodiments of the present invention.

FIG. 2 is schematic illustration of a wireless communication network according to exemplary embodiments of the present invention. For example, wireless communication network 100 may operate according to the standard developed by the IEEE 802 802.11 Task Group ad (TGad) and/or according to WGA specification and/or according to IEEE 802.15.3c standard and/or according to WirelessHD™ specification and/or ECMA-387 standard or the like.

FIG. 2 shows two states of wireless network 200. State A is the state before switching traffic stream identifications (TSID) 270 and 280 and state B is the state after switching TSID 270 and 280.

Although the scope of the present invention is not so limited, wireless communication network 200 may include a station A 210 and a station B 240. Station A may include a radio A 220 and a radio B 230 and station B may include a radio A 250 and a radio B 260. Station (STA) A 210 may be referred to herein as an Originator and STA B 240 may be referred to herein as a Recipient, although the scope of the present invention is not limited in this respect.

According to one embodiment of the invention, STA A 210 and STA B 240 architecture and components may be similar to the architecture and components of STA 100 of FIG. 1 if desired In operation, before switching TSID1 and TSID2, STA A 210 and STA B 220 may operate on a first frequency band, for example 60 GHz by transmitting and receiving TSID1 and TSID2 by radio A 220 of STA A 210 and radio A of STA B 240, if desired. This frequency band may also referred to as an active band and the frequency band of radio B 230 and radio B 260 may be referred to as a passive band, although the scope of the present invention is not limited in this respect.

Before Switching State

Without deleting TSID1 and TSID2 that operate in the current frequency band and before radio A 220 and radio A 250 switched to the passive band, STA A 220 and STA B 240 may establish TS for example, TSID1 and TSID 2, on the active band to operate on the passive band which is also may be another frequency band e.g., 5 GHz, if desired.

After Switching State

After the establishing the TSID1 and TSID 2, on the active band STA A 210 and STA B 240 may switch their radios (e.g., switching radio A 220 to radio B 230 and switching radio A 250 to radio B 260) thus the active band may be become passive band and the passive band may become an active band. After the switching the stations may immediately start operation on the established TS e.g., TSID 1 and TSID 2 and delete TSID1 and TSID 2 of the previous frequency band, although the scope of the present invention is not limited to this example.

According to another embodiment of the invention multiband stations STA A 210 and STA B 240 may manage traffic streams (TS) when switching between frequency bands of the multiband stations by creating a TS at a first frequency band (e.g., 60 GHz) by including a channel information, information on a frequency band and MAC address information as part of a resource management frame while communicating at the first frequency band, if desired. STA A 210 and STA B 240 may set, establish or create a communication agreement by exchanging resource management frames between first and second multiband stations for example STA A 210 and STA B 240. For example, STA A 210 may send an ADDTS Request ("add traffic stream") frame addressed to STA B 240. The ADDTS Request frame may include the new channel information, the new frequency band e.g., 5 GHz the MAC address used in the new frequency band.

According to one exemplary embodiment of the invention, STA B 240 may send an ADDTS Response frame on the same channel and the same frequency band through which the ADDTS Request frame was previously transmitted. STA A 210 may receive the ADDTS Response frame and may set and/or create the TS with the multiband station, STA B 240 without switching to a new channel and a new frequency band, by providing a traffic stream identification number (TSID) to multiband station STA B 240, if desired. After setting the TS STA A 210 and STA B 240 may switch their radios to the frequency band and channel indicated in the ADDTS request and response frames in order to provide the TS in the new frequency band, although it should be understood that the scope of the present invention is not so limited.

According to one other exemplary embodiment of the invention, STA A 210 and STA B 240 may switch to the new channel and the new frequency band indicated by the ADDTS Request frame previously transmitted. STA B 240 may send an ADDTS Response frame on the new channel and the new frequency band. STA A 210 may receive the ADDTS Response frame and may set the TS with the multiband station STA B 240 and providing the TS in the new frequency band, although it should be understood that the scope of the present invention is not limited to this embodiment of the invention.

Figures 3, 4:
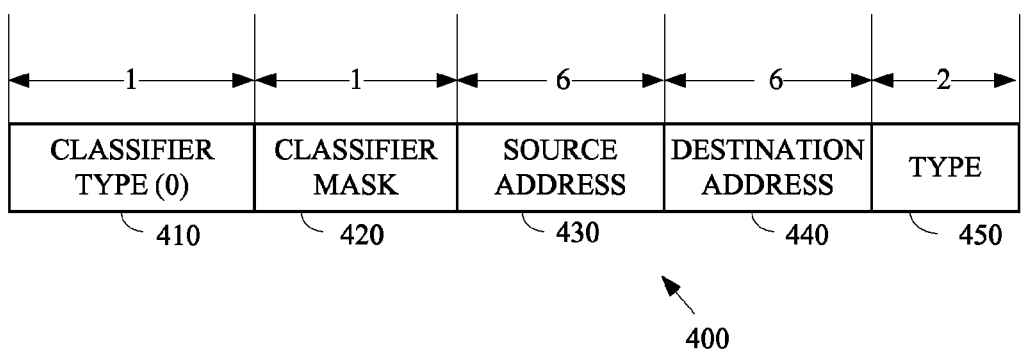
FIG. 3 is a schematic illustration of ADD block acknowledgment (ADDBA) request and response frames, according to exemplary embodiments of the invention.
FIG. 4 is a schematic illustration of a transmit class (TCLAS) element of Ethernet type frame of the ADDBA request and response frames of FIG. 3, according to an exemplary embodiment of the invention.

Turning to FIG. 3 a schematic illustration of ADD block acknowledgment (ADDBA) request and response frames, according to exemplary embodiments of the invention, is shown. According to this example, an ADDBA request frame 300 may include but is not limited to, the following information and elements: a category, an action, a dialog token, a block acknowledge parameter, a block acknowledge timeout, a block acknowledge, a Start Sequence Number (SSN), a band identification (ID) and a traffic calcification (TCLAS). An ADDBA response frame 310 may include for example, the following information: a category, an action, a dialog token, a block acknowledge parameter, a block acknowledge timeout, a block acknowledge SSN, a band ID and a TCLAS, although the scope of the present invention is not limited to this respect.

According to embodiments of the invention, category and action fields may be used to identify for example, the ADDBA request and response frames, respectively. The dialog token may be used to identify the ADDBA response in relation to the ADDBA request, both may include the same dialog token. Block acknowledge parameters may represent a buffer size allocated for the block acknowledge operation and the TSID, if desired. The block acknowledge (BA) timeout may be used to maintain the BA activity. The SSN may represent sequence number of the first frame sent under BA control. The Status code may include the result of the ADDBA negotiation e.g., successful/unsuccessful. It should be understood that the above described parameters may not have specific meaning and may be used as in the BA agreement with embodiments of the present invention.

The band ID may include the band and channel information of the frequency band and channel information in which the BA agreement may operate. It should be understood that the ADDBA request and response may happen in the active band but the data may be transferred in the passive band. The TCLAS delivers the MAC address may be used in the passive band, although the scope of the present invention is not limited in this respect.

Turning to FIG. 4 a schematic illustration of a transmit class (TCLAS) element 300 of Ethernet type frame of the ADDBA request and response frames of FIG. 3, according to an exemplary embodiment of the invention is shown. Although the scope of the present invention is not limited in this respect, the frame may include at least a classifier type field 410, a classifier mask field 420, a source address 430, a destination address 440, a type field 450 and other fields, if desired. For example, classifier type field 410 and a classifier mask field 420 may represent that the TCLAS includes the source address that is used in the passive band, although the scope of the present invention is not limited in this respect.

Figure 5:
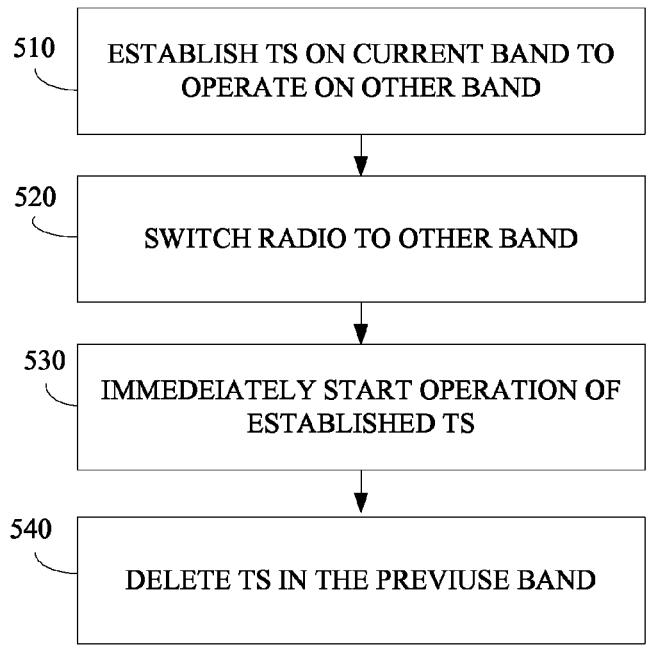
FIG. 5 is a schematic illustration of flowchart of a method of traffic stream switching according to one exemplary embodiment of the invention.

Turning to FIG. 5 a schematic illustration of flowchart of a method of traffic stream switching according to one exemplary embodiments of the invention is shown. An Originator e.g., STA 220, may be in communication with a Recipient e.g., STA 240 over one frequency band for example a 60 GHz frequency band. Without deleting TS that operates in the current frequency band and before the radio of the Originator is switched to the other frequency band, the Originator may establish or create a TS on this frequency band to operate on another frequency band e.g., 5 GHz, if desired (text box 510). After the establishing the TS the Originator may switch its radio to the other frequency band for example 5 GHz, if desired (text box 520) and immediately may start operation on the established TS (text box 530). The TS of the previous frequency band may be deleted (text box 540), although the scope of the present invention is not limited to this example.

Figure 6:
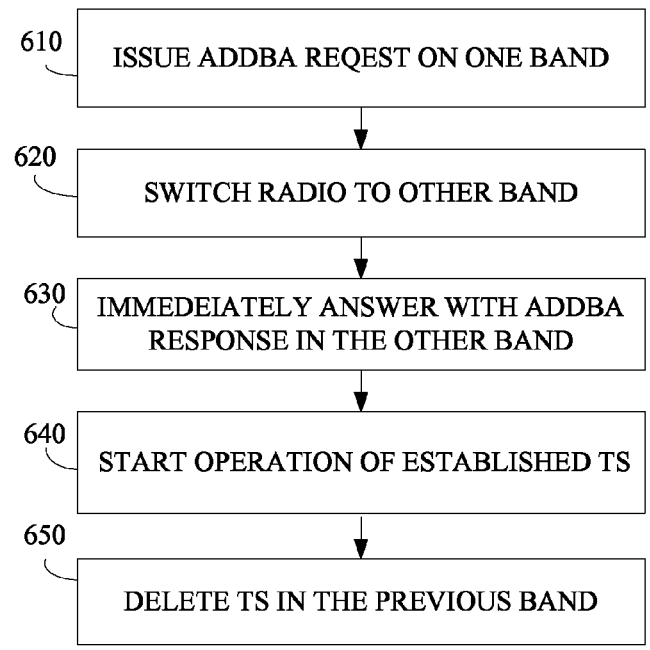
FIG. 6 is a schematic illustration of flowchart of a method of traffic stream switching according to another exemplary embodiment of the invention.

Turning to FIG. 6 a schematic illustration of flowchart of a method of traffic stream switching according to another exemplary embodiment of the invention is shown. An Originator e.g., STA 220 may be in communication with a Recipient e.g., STA 240 over one frequency band, for example, a 60 GHz frequency band. Without deleting TS that operates in the current frequency band and before the radio of the Originator is switched to the other frequency band, the Originator may issue ADDBA request on this frequency band (text box 610). The Originator and Responder may each switch its radio to another frequency band e.g., 5 GHz (text box 620). The Responder may responds with ADDBA response (text block 630) and the Originator and the Responder may start operation of the established TS (text box 640). The method may end by deleting the TS of the previous frequency band (text box 650), although the scope of the present invention is not limited to this example.

Figure 7:
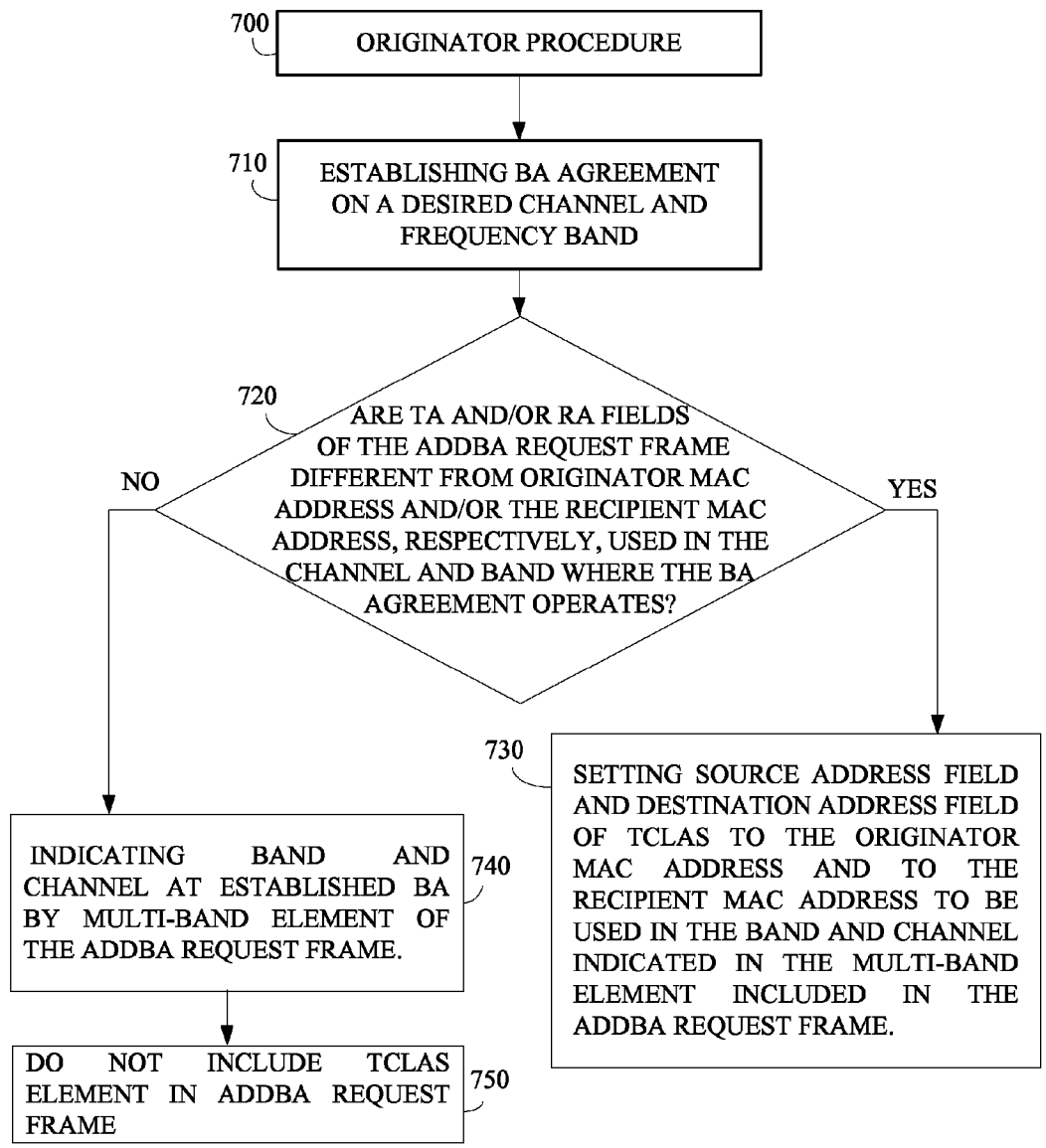
FIG. 7 is a schematic illustration of flowchart of a method of traffic stream switching at an originator according to some exemplary embodiments of the invention.

Turning to FIG. 7, a schematic illustration of flowchart of a method of traffic stream switching at an originator, according to some exemplary embodiments of the invention is shown. According to an embodiment of the invention a BA agreement is a state of the wireless communication system after a successful exchange of the ADDBA request and response that allows data exchange under BA control.

Although the scope of the present invention is not limited in this respect, the Originator may establish a BA agreement on a desired channel and frequency band, for example the 60 GHz frequency band (text block 710). An originator procedure 700 may have two methods of operation. For example, after establishing the BA agreement on a desired channel and frequency band, the originator may check if a transmit address (TA) and/or a receive address (RA) field of the ADDBA request frame is different from the Originator MAC address e.g., STA 220 and/or from the recipient MAC address e.g., STA 240, respectively which used in the channel and frequency band where the BA agreement operates (diamond 720). If the result of the check is that conditions above have met then the Originator may set in a source address field (e.g. source address 430) and destination address field (e.g., destination address 440) of TCLAS element 400 of the Originator MAC address and the Recipient MAC address to be used in the frequency band and channel indicated in a band ID element include in the ADDBA request frame 300 (text box 730). If the result of the check is that conditions above have not been met then the Originator may indicate or insert the frequency band and the channel according to the established BA agreement at a band ID element of the ADDBA request frame 300 (text block 740) and may not include the TCLASS element 400 in the ADDBA request frame e.g., ADDBA request frame 300 (text block 750).

Figure 8:
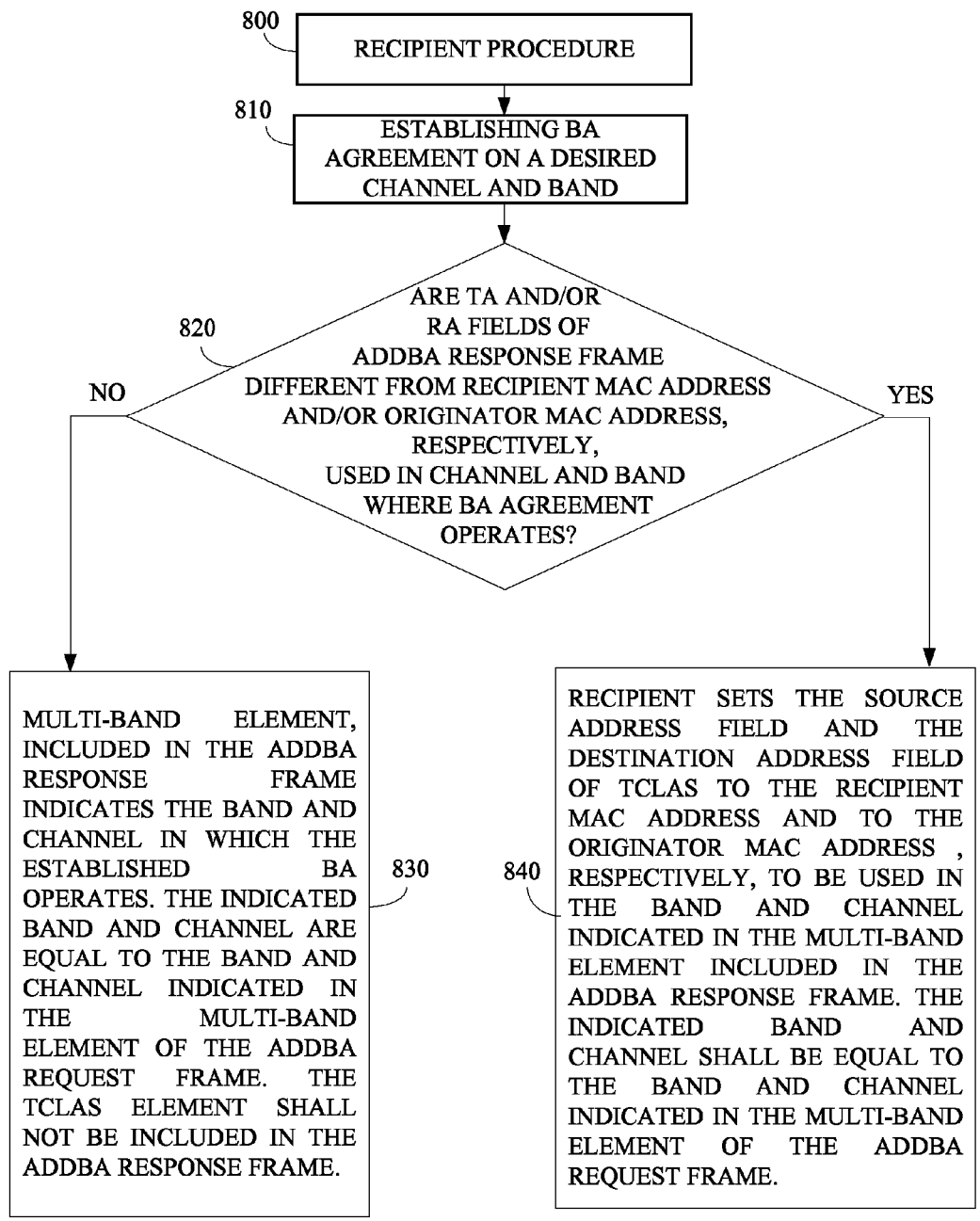
FIG. 8 is a flowchart of a method of traffic stream switching at a Recipient according to an exemplary embodiment of the invention.

FIG. 8 is a flowchart of a method of traffic stream switching at a Recipient according to an exemplary embodiment of the invention. According to this example the Recipient procedure (text block 800) may operate on an established BA agreement on a desired channel and frequency band (text block 810). Although the scope of the present invention is not limited in this respect, the Recipient procedure 800 may have two methods of operation. For example, the Recipient may check if a transmit address (TA) and/or a receive address (RA) field of the ADDBA response frame 310 is different from the Recipient MAC address e.g., STA 240 and/or from the Originator MAC address e.g., STA 220, respectively (diamond 820). If the result of the check is that conditions above have been met then the Recipient may set the source address field 430 and the destination address 440 of the TCLASS element 400 to the recipient MAC address and to the Originator MAC address, respectively, to be used in the frequency band and the channel indicated in the band ID element included in the response frame. For example, the indicated frequency band and channel may be equal to the frequency band and channel indicated in the band ID element of the ADDBA request frame 300, if desired (text block 840).

If the result of the check is that the conditions above (e.g., diamond 820) have not been met, then the Recipient may indicate at the band ID element included at ADDAB response frame 310 the frequency band and the channel that the BA agreement may operate on (text box 830). For example, the indicated frequency band and channel may be equal to the frequency band and channel indicated at the band ID element of the ADDBA request frame 300. According to this example, the TCLASS element 400 may not be included in the ADDBA response frame 310 (text box 830), although it should be understood that the scope of the present invention is not limited in this respect.

According to an embodiment of the invention, the following example rules for a multiband BA establishment may apply (other rules may apply):

1. If the TA MAC address and/or the RA address of the ADDBA request frame is different respectively from the Originator MAC address and/or the Recipient MAC address to be used in the frequency band the BA agreement may operate, then the Originator may assert a Source Address field and a Destination address field included in the TCLAS element 400, respectively, to the Originator MAC Address and to the Recipient MAC address to be used in the frequency band indicated by the band-ID included in the ADDBA request frame e.g., ADDBA request frame 300.

2. Else if the TA and RA MAC addresses are equal to the Originator MAC address and the Recipient MAC address, respectively the band-ID if included in the ADDBA request frame shall indicate the frequency band the established BA operates. The TCLAS element 400 may be not included in this ADDBA request frame 300.

3. The Band-ID should not be included in ADDBA request frame 300 if in the case (2) ADDBA request frame 300 may be issued in the same frequency band the BA may operate.

4. If the TA MAC address and/or the RA address of ADDBA response frame 310 is different respectively, from the Recipient MAC address and/or the Originator MAC address to be used in the frequency band the BA agreement may operate, then the Recipient may assert Source Address field 430 and Destination address field 440 in TCLAS element 400 respectively, to the Recipient MAC Address and to the Originator MAC address to be used in the frequency band indicated by the band-ID included in the ADDBA response frame. The indicated frequency band may be equal to the frequency band indicated by the band-ID of ADDBA request frame 300.

5. Else if the TA and RA MAC addresses are equal to the Recipient MAC address and the Originator MAC address respectively, the band-ID element if included in ADDBA response frame 310, may indicate the frequency band the established BA operates. The indicated frequency band may be equal to the frequency band indicated by the Band-ID of ADDBA request frame 310. The TCLAS element 400 may not be included in this ADDBA response frame 310.

6. The band ID element may not be included in ADDBA response frame 310 if in the case (5) ADDBA response frame 310 is issued in the same frequency band the BA, if established, may operate.

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of managing traffic streams when switching between frequency bands of a multiband station, the method comprising:
    creating a traffic stream on a first frequency band by including channel information, a frequency band and medium access control (MAC) address information as part of a resource management frame while communicating on the first frequency band;
    setting a communication agreement by exchanging the resource management frame between first and second multiband stations, wherein setting comprises sending an Add Traffic Stream (ADDTS) Request frame addressed to the second multiband station, and setting the traffic stream with the second multiband station in a first channel of the first frequency band, wherein the ADDTS Request frame includes second channel information, a second frequency band and a MAC address used in the second frequency band;
    switching to the second frequency band; and
    providing the traffic stream on the second frequency band.

2. The method of claim 1, wherein creating comprises providing a traffic stream identification number (TSID).

3. The method of claim 1 comprising:
    receiving an ADDTS Response frame from the second station on a same channel and a same frequency band through which the ADDTS Request frame was previously transmitted.

4. The method of claim 1 comprising:
    receiving an ADDTS Response frame from the second station on the second channel and the second frequency band included in the ADDTS Request frame previously transmitted.

5. A method of managing traffic streams when switching between frequency bands of a multiband station, the method comprising:
    creating a traffic stream on a first frequency band by including channel information, a frequency band and medium access control (MAC) address information as part of a resource management frame while communicating on the first frequency band;
    setting a communication agreement by exchanging the resource management frame between first and second multiband stations, wherein setting comprising sending an Add Block Acknowledgement (ADDBA) Request frame addressed to the second multiband station, and setting the traffic stream with the second multiband station in a first channel of the first frequency band, wherein the ADDBA Request frame includes first channel information, the first frequency band and a MAC address used in the first frequency band.

6. The method of claim 5, comprising:
receiving an ADDBA Response frame from the second station on a same channel and a same frequency band through which the ADDBA Request frame was previously transmitted.

7. The method of claim 5 comprising:
receiving an ADDBA Response frame from the second station on a different channel and a different frequency band through which the ADDBA Request frame was previously transmitted.

8. A multiband station comprising:
at least a first radio and a second radio, wherein the first radio is to operate in a first channel and a first frequency band and the second radio is to operate in a second channel and a second frequency band; and
a medium access control (MAC) processor to initiate a creation of a traffic stream at the first frequency band by including channel information, a frequency band and medium access control (MAC) address information as part of a resource management frame while communicating at the first frequency band, to set a communication agreement by exchanging the resource management frame between first and second multiband stations, to switch to the second frequency band and to provide the traffic stream in the second frequency band, wherein the traffic stream is data flow and/or stream between the first and second multiband stations, wherein the operation of setting the communication agreement by the MAC processor comprises sending an Add Traffic Stream (ADDTS) Request frame addressed to the second multiband station, and setting the traffic stream with the second multiband station in the first channel of the first frequency band, and wherein the ADDTS Request frame includes second channel information, the second frequency band and a MAC address used in the second frequency band.

9. The multiband station of claim 8, wherein the operation of setting the communication agreement by the MAC processor comprises:
receiving an ADDTS Response frame from the second station on a same channel and a same frequency band through which the ADDTS Request frame was previously transmitted.

10. The multiband station of claim 8, wherein the operation of setting the communication agreement by the MAC processor comprises:
receiving an ADDTS Response frame from the second station on the second channel and the second frequency band included in the ADDTS Request frame previously transmitted.

11. A multiband station comprising:
at least a first radio and a second radio, wherein the first radio is to operate in a first channel and a first frequency band and the second radio is to operate in a second channel and a second frequency band; and
a medium access control (MAC) processor to initiate a creation of a traffic stream at the first frequency band by including channel information, a frequency band and medium access control (MAC) address information as part of a resource management frame while communicating at the first frequency band, to set a communication agreement by exchanging the resource management frame between first and second multiband stations, to switch to the second frequency band and to provide the traffic stream in the second frequency band, wherein the traffic stream is data flow and/or stream between the first and second multiband stations, wherein the operation of setting the communication agreement by the MAC processor comprises sending an Add Block Acknowledgement (ADDBA) Request frame addressed to the second multiband station, and setting the traffic stream with the second multiband station in the first channel of the first frequency band, and wherein the ADDBA Request frame includes first channel information, the first frequency band and a MAC address used in the first frequency band.

12. The multiband station of claim 11, wherein the operation of setting the communication agreement by the MAC processor comprises:
receiving an ADDBA Response frame from the second station on a same channel and a same frequency band through which the ADDBA Request frame was previously transmitted.

13. The multiband station of claim 11, wherein the operation of setting the communication agreement by the MAC processor comprises:
receiving an ADDBA Response frame from the second station on a different channel and a different frequency band through which the ADDBA Request frame was previously transmitted.

14. A wireless communication system comprising:
at least one multiband station,
wherein the multiband station comprises:
at least a first radio and a second radio, wherein the first radio is to operate in a first channel and a first frequency band and the second radio is to operate in a second channel and a second frequency band;
a first phase array antenna operably coupled to the first radio;
a second phase array antenna operably coupled to the second radio; and
a medium access control (MAC) processor to initiate a creation of a traffic stream at the first frequency band by including channel information, a frequency band and MAC address information as part of a resource management frame while communicating at the first frequency band, to set a communication agreement by exchanging the resource management frame between first and second multiband stations, to switch to the second frequency band and to provide the traffic stream in the second frequency band, wherein the operation of setting the communication agreement by the MAC processor comprises sending an Add Traffic Stream (ADDTS) Request frame addressed to the second multiband station, and setting the traffic stream with the second multiband station in the first channel of the first frequency band, wherein the ADDTS Request frame includes second channel information, the second frequency band and a MAC address used in the second frequency band.

15. The wireless communication system of claim 14, wherein the operation of setting the communication agreement by the MAC processor comprises:
receiving an ADDTS Response frame from the second multiband station on a same channel and a same frequency band through which the ADDTS Request frame was previously transmitted.

16. The wireless communication system of claim 14, wherein the operation of setting the communication agreement by the MAC processor comprises:
receiving an ADDTS Response frame from the second multiband station on the second channel and the second frequency band included in the ADDTS Request frame previously transmitted.

17. A wireless communication system comprising:
at least one multiband station,
wherein the multiband station comprises:
at least a first radio and a second radio, wherein the first radio is to operate in a first channel and a first frequency band and the second radio is to operate in a second channel and a second frequency band;
a first phase array antenna operably coupled to the first radio;
a second phase array antenna operably coupled to the second radio; and
a medium access control (MAC) processor to initiate a creation of a traffic stream at the first frequency band by including channel information, a frequency band and MAC address information as part of a resource management frame while communicating at the first frequency band, to set a communication agreement by exchanging the resource management frame between first and second multiband stations, to switch to the second frequency band and to provide the traffic stream in the second frequency band, wherein the operation of setting the communication agreement by the MAC processor comprises sending an Add Block Acknowledgement (ADDBA) Request frame addressed to the second multiband station, and setting the traffic stream with the second multiband station in the first channel of the first frequency band, wherein the ADDBA Request frame includes first channel information, the first frequency band and a MAC address used in the first frequency band.

18. The wireless communication system of claim 17, wherein the operation of setting the communication agreement by the MAC processor comprises:
receiving an ADDBA Response frame from the second multiband station on a same channel and a same frequency band through which the ADDBA Request frame was previously transmitted.

19. The wireless communication system of claim 17, wherein the operation of setting the communication agreement by the MAC processor comprises:
receiving an ADDBA Response frame from the second station on a different channel and a different frequency band through which the ADDBA Request frame was previously transmitted.

20. An article including a non-transitory storage medium having stored thereon instructions that, when executed by a machine, result in:
creating a traffic stream on a first frequency band by including channel information, a frequency band and medium access control (MAC) address information as part of a resource management frame while communicating on the first frequency band;
setting a communication agreement by exchanging the resource management frame between first and second multiband stations, wherein setting comprises sending an Add Traffic Stream (ADDTS) Request frame addressed to the second multiband station, and setting the traffic stream with the second multiband station in a first channel of the first frequency band, wherein the ADDTS Request frame includes second channel information, a second frequency band and a MAC address used in the second frequency band;
switching to the second frequency band; and
providing the traffic stream on the second frequency band.

21. The article of claim 20, wherein the instructions result in:
receiving an ADDTS Response frame from the second station on a same channel and a same frequency band through which the ADDTS Request frame was previously transmitted.

22. The article of claim 20, wherein the instructions result in:
receiving an ADDTS Response frame from the second station on the second channel and the second frequency band included in the ADDTS Request frame previously transmitted.

23. An article including a non-transitory storage medium having stored thereon instructions that, when executed by a machine, result in:
creating a traffic stream on a first frequency band by including channel information, a frequency band and medium access control (MAC) address information as part of a resource management frame while communicating on the first frequency band;
setting a communication agreement by exchanging the resource management frame between first and second multiband stations, wherein setting comprising sending an Add Block Acknowledgement (ADDBA) Request frame addressed to the second multiband station, and setting the traffic stream with the second multiband station in a first channel of the first frequency band, wherein the ADDBA Request frame includes first channel information, the first frequency band and a MAC address used in the first frequency band.

24. The article of claim 23, wherein the instructions result in:
receiving an ADDBA Response frame from the second station on a same channel and a same frequency band through which the ADDBA Request frame was previously transmitted.

25. The article of claim 23, wherein the instructions result in:
receiving an ADDBA Response frame from the second station on a different channel and a different frequency band through which the ADDBA Request frame was previously transmitted.

* * * * *

UNITED STATES PATENT AND TRADEMARK OFFICE
CERTIFICATE OF CORRECTION

| | | |
|---|---|---|
| PATENT NO. | : 8,737,368 B2 | Page 1 of 1 |
| APPLICATION NO. | : 12/977244 | |
| DATED | : May 27, 2014 | |
| INVENTOR(S) | : Trainin | |

It is certified that error appears in the above-identified patent and that said Letters Patent is hereby corrected as shown below:

In the Drawings:

On Drawing sheet 3 of 5, FIG. 5, reference numeral 530, line 1, delete "IMMEDEIATELY" and insert -- IMMEDIATELY --, therefor.

On Drawing sheet 3 of 5, FIG. 5, reference numeral 540, line 1, delete "PREVIUSE" and insert -- PREVIOUS --, therefor.

On Drawing sheet 3 of 5, FIG. 6, reference numeral 610, line 1, delete "REQEST" and insert -- REQUEST --, therefor.

On Drawing sheet 3 of 5, FIG. 6, reference numeral 630, line 1, delete "IMMEDEIATELY" and insert -- IMMEDIATELY --, therefor.

Signed and Sealed this
Eighteenth Day of November, 2014

Michelle K. Lee
*Deputy Director of the United States Patent and Trademark Office*